United States Patent [19]
Chronister et al.

[11] 3,904,171
[45] Sept. 9, 1975

[54] MULTI-FUNCTION CAM OPERATOR FOR VALVE

[75] Inventors: Clyde H. Chronister; Cecil C. Grieger; Alton D. Oliver, all of Houston; Roy W. Benefield, Magnolia, all of Tex.

[73] Assignee: Chronister Development, Inc., Houston, Tex.

[22] Filed: Sept. 26, 1974

[21] Appl. No.: 509,625

[52] U.S. Cl. ............... 251/159; 251/162; 74/471 R
[51] Int. Cl.² ..................................... F16K 31/524
[58] Field of Search ................. 251/159, 160, 162; 74/471 R, 567

[56] References Cited
UNITED STATES PATENTS

| | | | |
|---|---|---|---|
| 2,934,309 | 4/1960 | Morser | 251/159 |
| 3,007,490 | 11/1961 | Passmore | 251/159 X |
| 3,731,545 | 5/1973 | Beezer | 74/567 X |
| 3,799,188 | 3/1974 | Chronister | 137/271 |

Primary Examiner—Alan Cohan
Attorney, Agent, or Firm—Fulbright & Jaworski

[57] ABSTRACT

A valve operator which controls several functions in a valve in which the functions are sequentially controlled by a cam controlled by a single actuator. In a valve having first and second valve elements which are positioned for movement into and out of a flow controlling position in which each of the valve elements have an actuating shaft, and a cam follower is connected to each actuating shaft. A cam engages each of the cam followers and the cam is shaped to control the desired movement of the first and second elements. A single actuator is connected to and actuates the cam for simultaneously controlling the movement of both valve elements.

2 Claims, 10 Drawing Figures

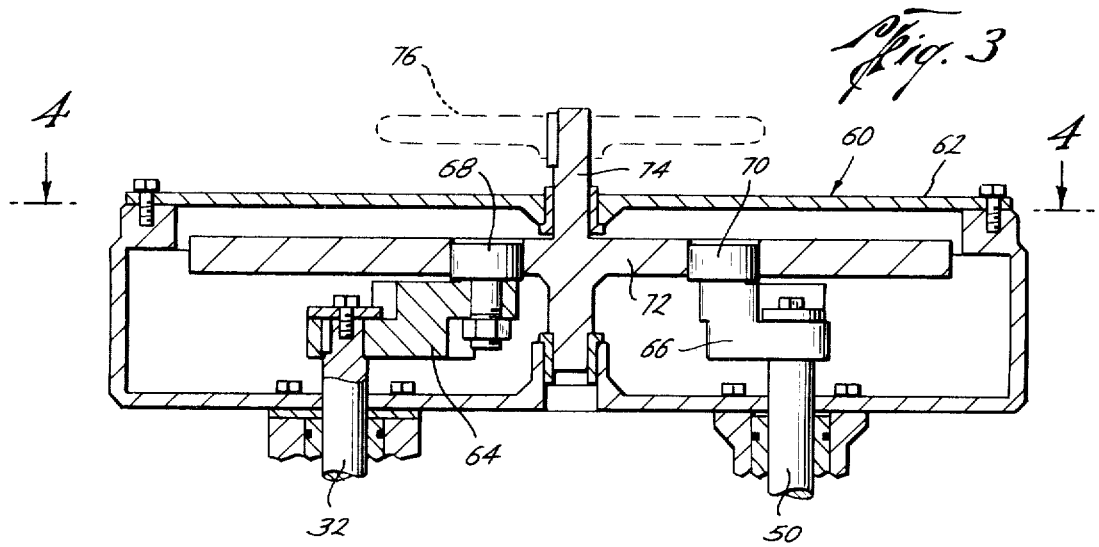
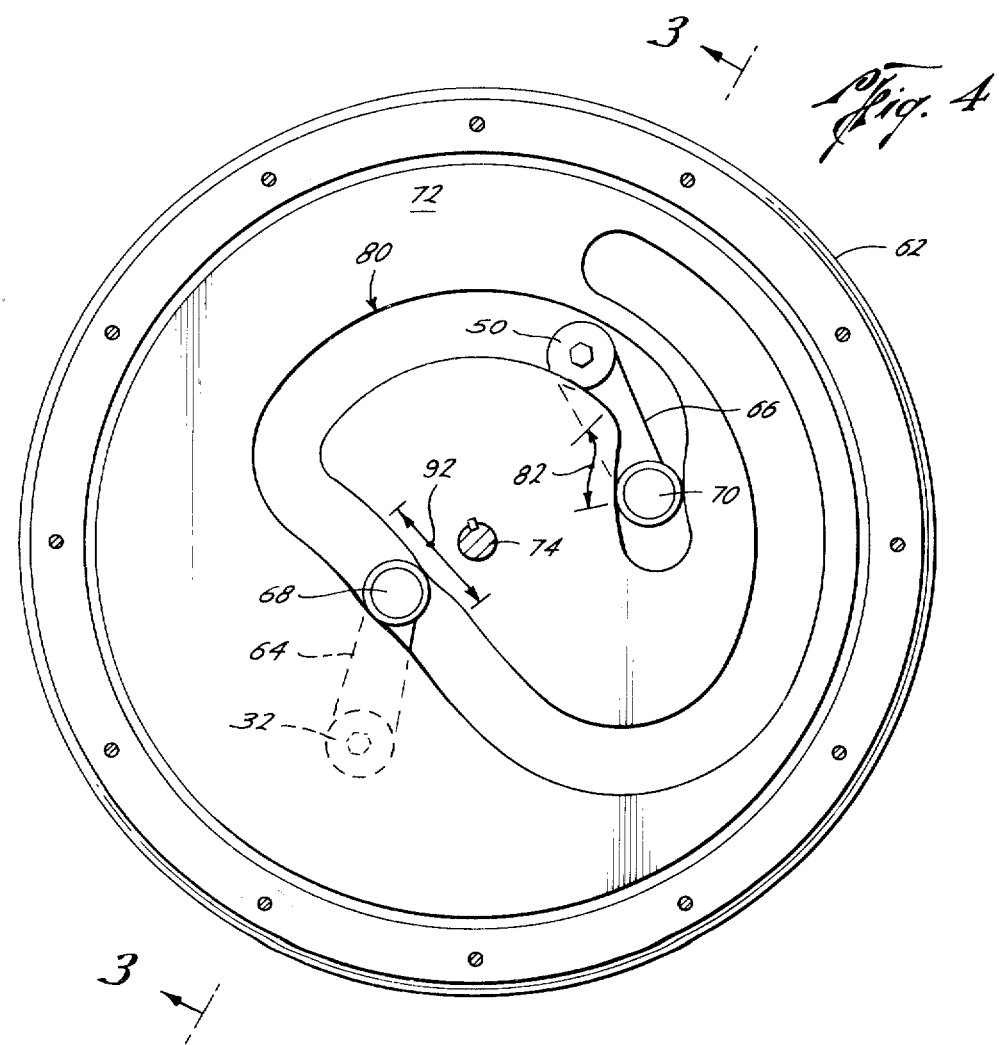

MULTI-FUNCTION CAM OPERATOR FOR VALVE

BACKGROUND OF THE INVENTION

Frequently a valve will have a plurality of components which must be actuated to operate the valve. For example, as shown in U.S. Pat. No. 3,799,188, the valve includes a sleeve which is extended between the valve inlet and outlet to provide a through conduit valve and retracts to allow a rotative flow control device for controlling the flow through the valve to be moved into and out of the opening between the inlet and the outlet. Such a valve utilizes separate actuators for controlling the telescoping sleeve and the rotating flow control device. The use of multiple operators increases the expense of the valve and also creates the possibility of confusion in actuating the valve since the multiple valve operators must be moved not only in the proper direction, but in the proper sequence particularly with the valve shown in the aforesaid mentioned patent, in which the telescoping sleeve may also telescope and coact with the rotating flow control device.

The present invention is directed to providing a single actuator which can, by the use of a cam, control a plurality of operating elements in a valve, and operate the valve elements in the proper sequence.

SUMMARY

The present invention is directed to a multi-function cam operator which controls a plurality of operations in a valve with a single actuator.

A still further object of the present invention is the provision of a valve operator for operating a valve having a plurality of movable elements in which a cam follower is connected to each of the elements, and cam means engage each of the cam followers and a single actuator is connected to the cam means for simultaneously and sequentially controlling the movement of all valve elements thereby insuring that the valve is properly and correctly operated.

Still a further object of the present invention is the provision of a valve actuator for actuating a valve having an inlet and an outlet longitudinally spaced forming an opening therebetween with a sleeve telescoping with the inlet and the outlet, and a flow control means pivotally supported for rotation into and out of the opening in which a cam controls both the movement of the telescoping sleeve and the rotating flow control device, and is in turn controlled by a single actuator for simultaneously and sequentially controlling the movement of both the sleeve and the flow control device.

Still a further object of the present invention is the provision of a multi-function cam which includes a sleeve retracting portion, a dwell portion and a sleeve extending portion and in which the flow control device portion correspondingly includes a first dwell portion, a flow control rotation portion and a second dwell portion, thereby controlling the movement of the sleeve and the flow control device relative to the valve opening and each other.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 3 is a cross-sectional view of the cam operator of the present invention actuating a plurality of valve elements of the valve shown in FIGS. 1 and 2, FIG. 4 is a cross-sectional view taken along the line 4—4 of FIG. 3 showing the position of the cam followers and cam when the valve is in the closed position as shown in FIGS. 1 and 2.

DESCRIPTION OF THE PREFERRED EMBODIMENT

While the multi-function cam operator of the present invention may be used to operate various types of valves normally requiring several operating functions, the present invention will be described, for purposes of illustration only, as operating a valve such as shown in U.S. Pat. No. 3,799,188.

Figure 1:
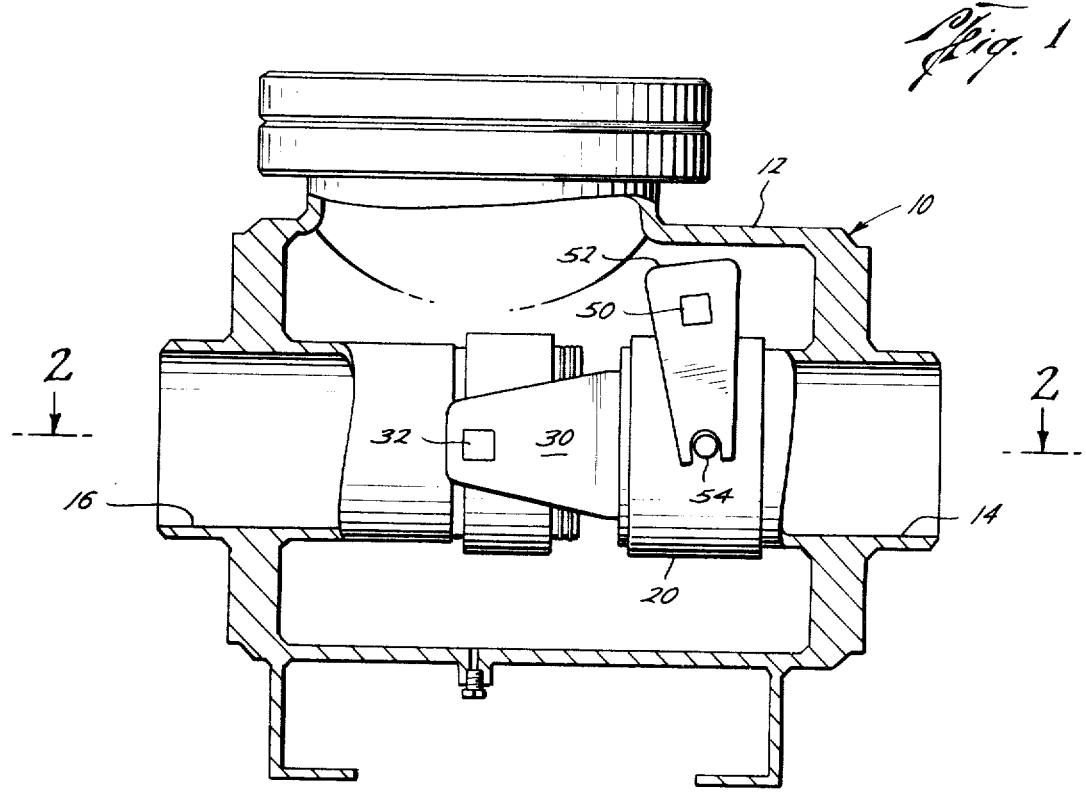
FIG. 1 is an elevational view, partly in cross section, of one type of valve with which the present invention may be utilized.
Figure 2:
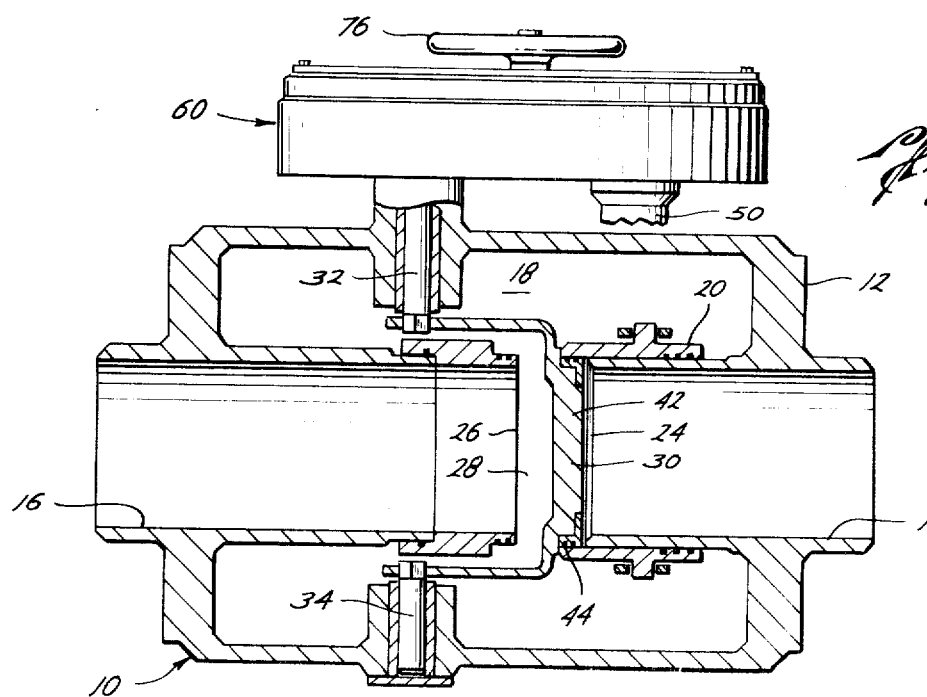
FIG. 2 is a cross-sectional view taken along the line 2—2 of FIG. 1.
Figure 6:
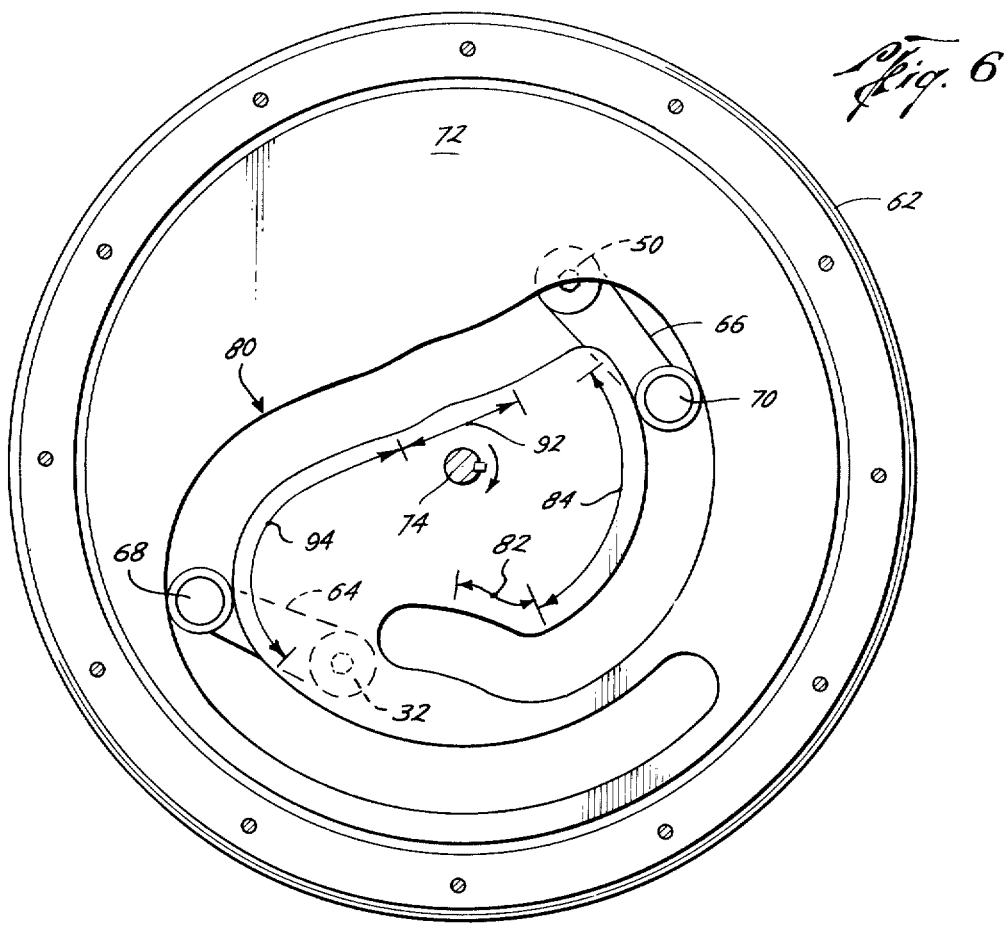
FIG. 6 is an elevational view of the cam and cam followers showing their relationship to each other when the parts of the valve shown are in the position illustrated in FIG. 6A.
Figure 6A:
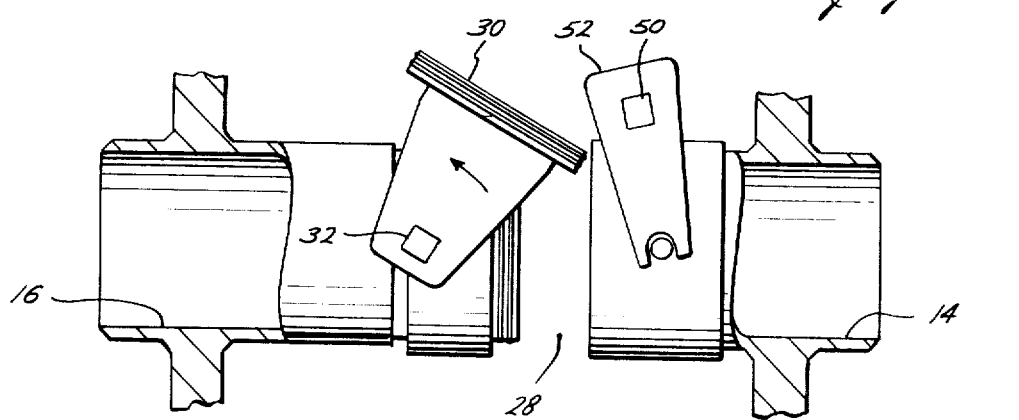
FIG. 6A is an elevational view, partly in cross section, illustrating the position of the valve parts when the cam and cam followers are in the position shown in FIG. 6.

Referring now to FIGS. 1 and 2, a valve generally indicated by the reference numeral 10 is shown which generally includes a housing 12, an inlet conduit 14 and an outlet conduit 16. The conduits 14 and 16 are axially aligned, but their respective internal ends 24 and 26 are longitudinally spaced from each other to provide an opening 28 therebetween. A sliding sleeve 20 is telescopically slidable on the conduits 14 and 16 in a sealing relationship. When the sleeve 20 is longitudinally moved to engage both ends 24 and 26 and cover the opening 28, as best seen in FIG. 7A, flow is permitted through the conduits 14 and 16 providing a through conduit valve. When the sleeve 20 is telescopically retracted on conduit 14, as best seen in FIG. 6A, the opening 28 is opened to the housing cavity 18. A flow control device, generally indicated by the reference numeral 30, is provided which may be rotated into the opening 28 for controlling the flow through the conduits 14 and 16, and rotated out of the opening 28 to permit the sleeve 20 to cover the opening 28. The flow control device 30 is pivotally mounted and supported from trunnion shafts 32 and 34, one of which, such as 32, extends out of the housing 12 for connection to a suitable actuating means. Preferably, the flow control device 30 includes a circular member 42 having seal means 44 to provide a telescopic engagement with the sleeve 20 and may be of any suitable flow controlling type as shown in U.S. Pat. No. 3,799,188.

The sleeve 20 is telescopically movable relative to the conduits 14 and 16 by rotation of a shaft 50 and yoke assembly 52 to engage pin 54 connected to the sleeve 20.

Figure 5:
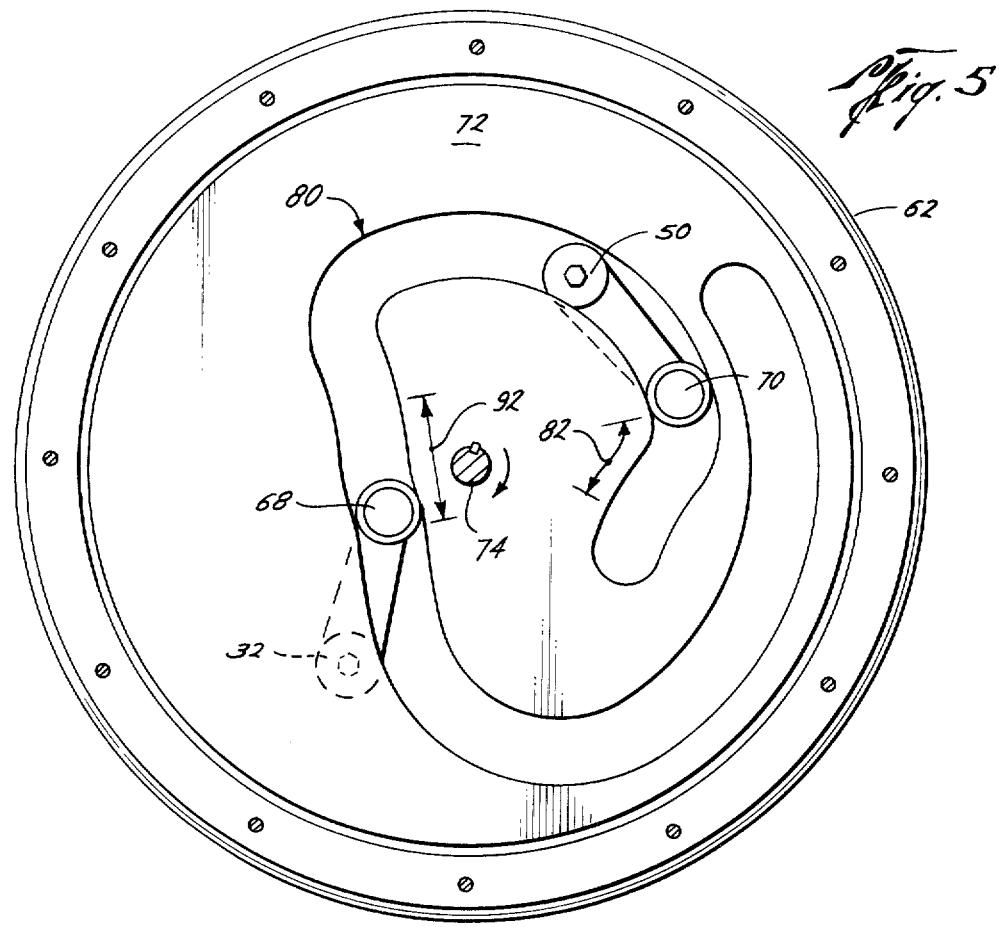
FIG. 5 is an elevational view showing the relationship between the cam followers and the cam in a position partly opening the valve as shown in FIG. 5A.
Figure 5A:
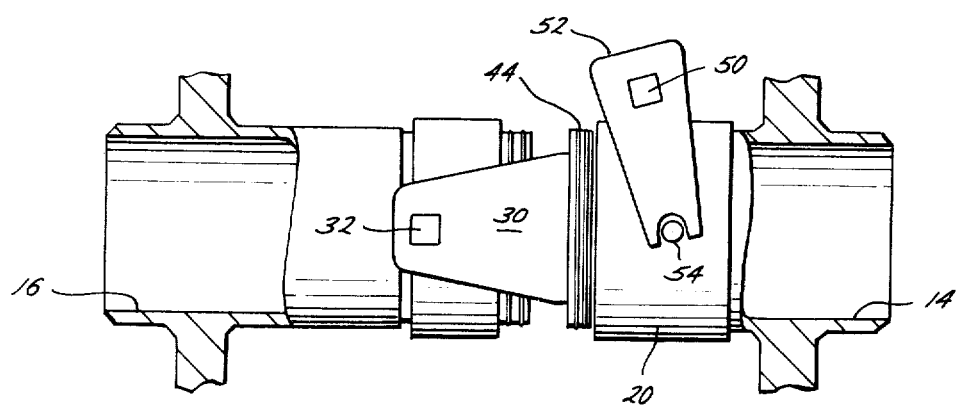
FIG. 5A is an elevational view, partly in cross section, illustrating the position of the valve when the cam followers are in the position shown in FIG. 5.

In operation, the valve 10 is shown in the closed position in FIG. 2 with the flow control device 30 positioned in the opening 28 and engaged by the sleeve 20 for shutting off flow from the inlet 14 and also shuts off flow from inlet 16 and housing cavity 18. To open the valve 10, the sleeve 20 is retracted, as best seen in FIG. 5A, out of engagement with the flow control device 30, then the flow control device 30 is rotated on its trunnions out of the opening 28, as best seen in FIG. 6A, and then the sleeve 20 is extended, as best seen in FIG. 7A, to sealingly engage both the inlet conduit 14 and the outlet conduit 16 to form the through conduit valve. In closing the valve 10, the sequence of operation is reversed. In operating the valve 10, it was, prior to the present apparatus, necessary to use a separate valve operator connected to the shaft 32 and a second valve operator connected to the shaft 50 for operating the sleeve 20. In addition to the expense of having multiple valve operators, it was possible that the separate operation of the shafts 32 and 50 would be performed in an improper sequence or direction resulting in the improper operation of the valve 10.

The present invention is directed to providing a multi-function cam operator to control the sequential operation of the shafts 32 and 50 in the proper direction and in the proper sequence to correctly operate the valve 10.

Referring now to FIGS. 2, 3 and 4, the multifunction cam operator of the present invention is generally indicated by the reference numeral 60 and generally includes a housing 62 which is supported from and mounted on the valve 10 and into which the actuating shaft 32, controlling the operation of the flow control device 30, and the actuating shaft 50, controlling the operation of the sleeve 20, extend. A control arm 64 is connected to the operating shaft 32 and a control arm 66 is connected to the operating shaft 50 whereby rotation of the control arms 64 and 66 control the rotational position of the shafts 32 and 50, respectively. Cam followers 68 and 70 are connected to the arms 64 and 66, respectively. A cam 72 is positioned in the housing 62 and pivotally supported by a rotatable shaft 74, preferably between the actuating shafts 32 and 50. A single valve actuator 76, which may be a hand wheel as shown, or a conventional motorized actuator, is connected to the shaft 74 for rotating the cam. The cam 72 includes a cam surface generally indicated by the reference numeral 80 engaging each of the cam followers 68 and 70 for controlling the movement of the flow control device 30 and the sleeve 20 into and out of the opening 28 between the inlet 14 and the outlet 16 in the proper sequence. By using a single actuator 76, and the control cam 72, the actuator 76 merely needs to be rotated in one direction to open the valve and to be moved in a second direction to close the valve thereby reducing the chance of operator error in manipulating the valve 10.

Referring now to FIG. 4, the position of the cam followers 68 and 70 in the slot forming the cam surface 80 are shown in a position corresponding to the valve 10 being in a closed position as shown in FIG. 2 in which the flow control device 30 is positioned in the opening 28 and is seatingly engaged by the sleeve 20. To open the valve, the actuator 76 is rotated in a clockwise direction moving the cam 72 in a clockwise direction. The first sequence of operation in opening the valve 10 is to retract the sleeve 20 while the flow control device 30 remains stationary. Therefore, the cam surface 80 includes a sleeve controlling portion having a sleeve retracting portion generally indicated as 82 which moves the cam follower 70 and rotates the shaft 50, as best seen in FIGS. 5 and 5A causing the sleeve 20 to retract on the inlet conduit 14 and move out of engagement with the flow control device 30. At the same time, the cam surface 80 includes a flow control device portion which includes a dwell portion 92 controlling the operation of the cam follower 60 to maintain the flow control device 30 in its closed position allowing the sleeve 20 to be retracted. Once the sleeve 20 is retracted, the flow control device 30 must be rotated out of the opening 28 between the inlet 14 and the outlet 16. As best seen in FIGS. 6 and 6A, cam surface 80 on the sleeve controlling portion, includes a dwell portion 84 following the sleeve retracting portion 82 which is in engagement with the sleeve cam follower 70 for maintaining the sleeve 20 in the retracted position. At the same time that dwell cam portion 84 is in engagement with cam follower 70, the flow control device cam portion includes a cam rotation portion 94 which is in engagement with the cam follower 68 rotating the flow control device 30 out of the opening 30 as the cam 72 is further rotated in the clockwise direction.

Figure 7:
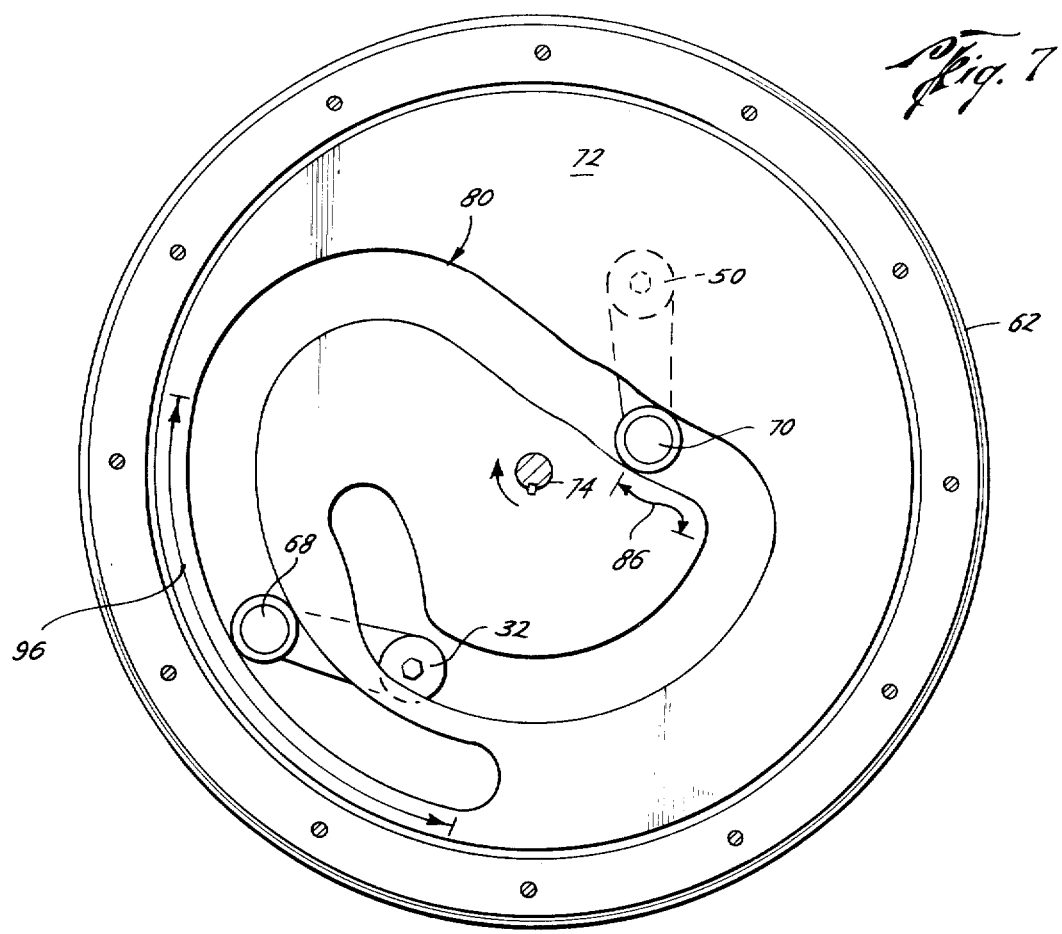
FIG. 7 is an elevational view showing the relationship between the cam followers and cam when the valve is moved to the flowing or opened position as shown in FIG. 7A.
Figure 7A:
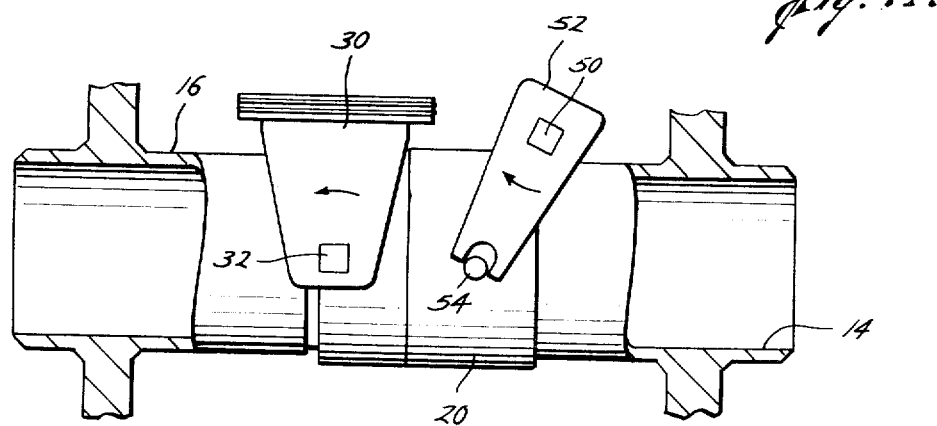
FIG. 7A is an elevational view, partly in cross section, illustrating the position of the valve components when the cam and cam followers are in the position shown in FIG. 7.

After the flow control device 30 is rotated out of position, further clockwise rotation of the cam 70, as best seen in FIGS. 7 and 7A, will act to move the sleeve 20 telescopically into engagement with the outlet conduit 16 for providing a flowing or open position between the inlet 14 and the outlet 16. Thus, the sleeve controlling portion of the cam surface 80 includes a portion 86 in engagement with the cam follower 70 which extends the sleeve 20 from the inlet conduit 14 into engagement with the outlet conduit 16. At the same time, the flow control device cam portion includes a dwell portion 96 for maintaining the flow control device 30 out of the path of travel of the telescoping sleeve 20.

In order to close the valve 10, the actuator 76 is rotated in a counterclockwise direction carrying the cam 72 also in the counterclockwise direction to reverse the sequence of operation as the cam surface 80 controls the movement of the cam followers 68 and 70 and the movement of the flow control device 30 and sleeve 20, respectively.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. A valve actuator for operating a valve having an inlet and an outlet longitudinally spaced forming an opening therebetween, a sleeve telescoping with the inlet and the outlet, a flow control device pivotally supported for rotation into and out of said opening, an actuating shaft connected to each of the sleeve and the flow control device and extending outside of said valve comprising, a cam follower connected to each actuating shaft, an arm extending between each cam follower and its connected shaft positioning said followers off of the axis of said shafts, cam means having a cam groove enclosing each of the cam followers, said cam means being pivotally mounted on a rotating shaft for rotation at a point between said actuating shafts, 2. The apparatus of claim 1 wherein the sleeve controlling portion of the cam includes in series a sleeve retracting portion, a dwell portion, and a sleeve extending portion which move into engagement with the sleeve cam follower, and the flow control device portion of the cam correspondingly includes a first dwell portion, a flow control rotation portion, and a second dwell portion which move into engagement with the flow control means cam follower.

* * * * *

UNITED STATES PATENT OFFICE
CERTIFICATE OF CORRECTION

PATENT NO. : 3,904,171
DATED : September 9, 1975
INVENTOR(S) : Clyde H. Chronister et al.

It is certified that error appears in the above-identified patent and that said Letters Patent are hereby corrected as shown below:

Claim 1, after the last paragraph, insert the following paragraphs:

said cam shaped to include a sleeve controlling portion and a flow control device portion for moving the sleeve and the flow control means into and out of said opening, and a single actuator connected to the rotating shaft and rotatably actuating said cam means for simultaneously and sequentially controlling the movement of both the sleeve and the flow control device.

Signed and Sealed this twenty-fifth Day of November 1975

[SEAL]

Attest:

RUTH C. MASON
Attesting Officer

C. MARSHALL DANN
Commissioner of Patents and Trademarks